(No Model.) 5 Sheets—Sheet 1.

F. P. McCOLL.
PACKAGE OR PACKING RECEPTACLE.

No. 566,998. Patented Sept. 1, 1896.

Witnesses,
Inventor,
Francis P. McColl
By Offield Towle Linthicum
Atty's.

(No Model.) 5 Sheets—Sheet 2.
F. P. McCOLL.
PACKAGE OR PACKING RECEPTACLE.

No. 566,998. Patented Sept. 1, 1896.

Witnesses,
Inventor,
Francis P. McColl
By Offield, Towle & Linthicum
Atty's.

(No Model.) 5 Sheets—Sheet 3.
F. P. McCOLL.
PACKAGE OR PACKING RECEPTACLE.
No. 566,998. Patented Sept. 1, 1896.
Fig. 9.
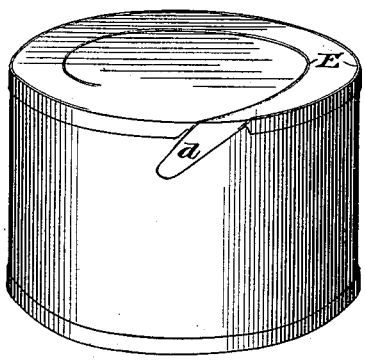
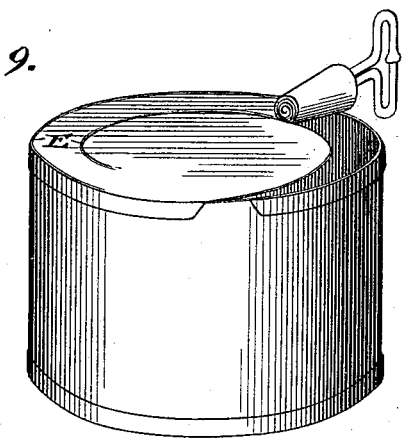
Fig. 10. Fig. 11. Fig. 12.
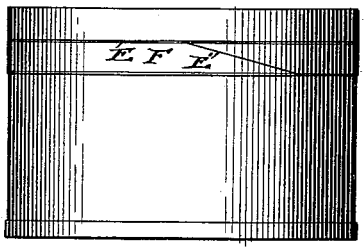
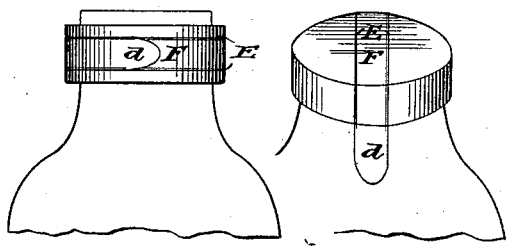
Fig. 13. Fig. 14.
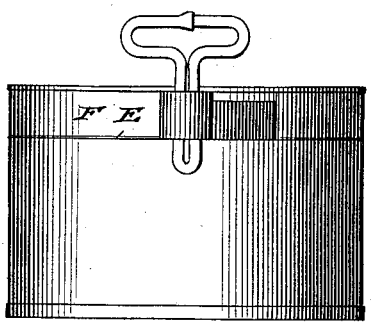
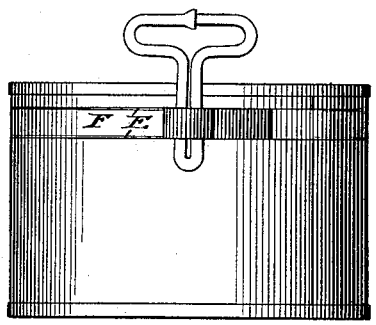
Witnesses, Inventor,
Francis P. McColl
By Offield, Towle & Linthicum
Attys.

(No Model.) 5 Sheets—Sheet 4.
F. P. McCOLL.
PACKAGE OR PACKING RECEPTACLE.
No. 566,998. Patented Sept. 1, 1896.
Fig. 15.
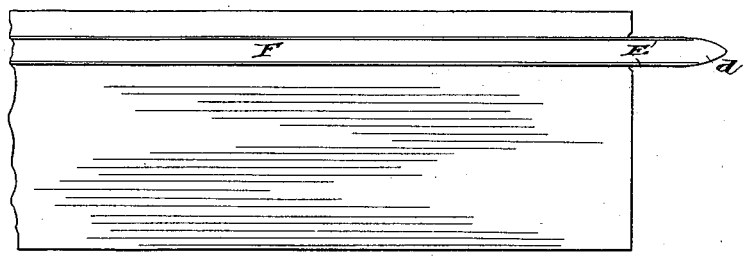
Fig. 16.
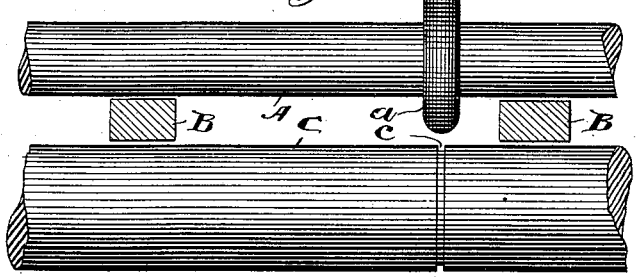
Fig. 17.
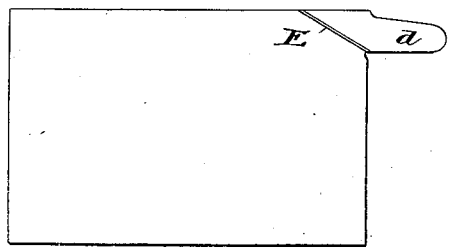
Fig. 18.
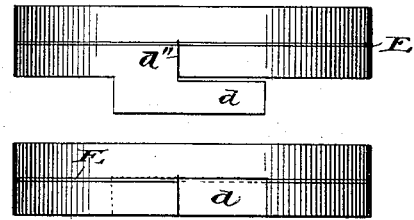
Fig. 19.
Witnesses,
Inventor,
Francis P. McColl
By Offield Towle & Linthicum
Att'ys (No Model.)  5 Sheets—Sheet 5.

F. P. McCOLL.
PACKAGE OR PACKING RECEPTACLE.

No. 566,998.  Patented Sept. 1, 1896.

Witnesses,
Inventor,
Francis P. McColl
By Offield Towle & Linthicum
Att'ys.

UNITED STATES PATENT OFFICE.

FRANCIS P. McCOLL, OF BROOKLYN, NEW YORK.

PACKAGE OR PACKING-RECEPTACLE.

SPECIFICATION forming part of Letters Patent No. 566,998, dated September 1, 1896.

Application filed April 3, 1896. Serial No. 586,038. (No model.)

*To all whom it may concern:*

Be it known that I, FRANCIS P. McCOLL, of Brooklyn, New York, have invented certain new and useful Improvements in Packages or Packing-Receptacles, of which the following is a specification.

This invention relates to that class of receptacles or packages which are so constructed as to adapt them to be opened by removing a portion of the material of which the vessel or some part thereof is composed. Vessels of this character have usually had such provisions made in the blanks out of which the bodies, heads, caps, or closures of the vessels are composed as to confine the part or portion to be removed between predetermined lines, the section which is to be removed being prolonged or extended in order to constitute what is called a "tongue" to facilitate the opening.

The principle of my invention is applicable to vessels or packages made wholly or in part of sheet metal or to the sheet-metal caps, capsules, or closures of vessels composed of other material than sheet-metal. I refer to such vessels as sheet-metal cans of all kinds, as well as bottles, jars, and the like to the filling-opening of which a cap, capsule, or closure is applied for the purpose of sealing the package.

In its broadest application my invention is applicable not only to the provision of means for opening a vessel, but also to such caps or closures as are intended to be applied over the filling-opening of a package, in which instances my invention serves to strengthen such capsule or closure.

Heretofore all provisions for making what is known as "key-opening packages" have proceeded along certain lines, and the previous methods may be conveniently grouped or classified as follows: First, the most common method has been to form weakening-lines by slits, incisions, grooves, or excoriations to define a predetermined path along which the metal could be severed; second, opening devices, such as rip-wires of various kinds have been used, located in beads, grooves, and the like formed in the material of which the package or some part thereof was composed and by means of which the metal was ruptured, torn, or separated upon the line followed by the wire or other opening device; third, strips have been soldered over openings formed in the body, head, cap, or closure of the vessel, and which strips being torn away from the solder enable the removal of the contents. All of these methods are objectionable, the first because the weakening-line impairs the strength of the material to resist strains, destroys the continuity of the coating applied, usually, to the material of which the package is composed, exposing it to corrosion when formed upon the outside, and tending to injure the contents of the vessel when formed upon the inside of the package or in some portion thereof to which the inclosed contents have access. The second method, namely, the rip-wire and kindred devices, is objectionable because of cost and also because it does not afford an easy or convenient means for opening the vessel, and the solder-strip method is so expensive as to prohibit its use commercially and besides is not adapted to be used on hermetically-sealed goods, being neither tight nor sufficiently strong.

My method is radically different from any of those heretofore proposed; and it consists in providing the material of some part of the vessel or the cap or closure thereof with a ridge which increases the strength of the material where it occurs. Then when my invention is applied to a self-opening vessel I preferably condense, solidify, or temper the material adjacent to the base of the ridge so as to cause the material to part or tear along or through such condensed, solidified, or tempered portion, the ridge controlling the parting or severing of the material and confining it to a line which will follow closely the base of such ridge. By my method the strength of the vessel or of the cap or closure is increased rather than diminished, the integrity of the material and of the coating thereof, if any, is preserved, and the vessel may thus be provided with an easy and convenient means of opening at a minimum cost.

In the drawings forming a part of this specification I have selected for illustrations embodying my invention such leading lines of cans and other receptacles as will show the wide applicability of my improvements, but I do not restrict myself to the particular forms and constructions illustrated.

In the accompanying drawings, Figures 1, 2, and 3 are enlarged sectional views showing the ridged sheets, but of exaggerated size. Figs. 4 to 8, inclusive, are diagrammatic views showing various forms of the ridge applied to the heads of such vessels. Fig. 9 gives perspective views showing a vessel having my opening provision applied to the cover thereof and extending down upon the flange of said cover, the view at the right hand showing the vessel partly opened. Fig. 10 is a view in side elevation of a can having the opening provision applied to the flange of the cover. Figs. 11 and 12 show my invention applied to a capsule, the former showing the opening provision in the side of the capsule and the latter across the body thereof. Fig. 13 shows a can provided with a tearing-strip one edge of which has the ridge and the other of which is soldered to the cap or cover and parts on the solder-line. Fig. 14 is a similar view of a can having a tearing-strip in the body thereof bounded by parallel ridges. Fig. 15 shows a blank having parallel ridges and an integral projecting tongue, the ridges extending upon the tongue and along the margins thereof. Fig. 16 is a broken elevation of a pair of rolls for forming the ridge. Figs. 17, 18, and 19 are detail views showing applications of my invention, the former showing an application to the body and the latter to the cover. Figs. 20 to 24, inclusive, show other applications of my invention, which will be hereinafter described.

The underlying principle of my invention being the provision of some portion of the body or closure of a packing vessel with a ridge whereby the metal is strengthened and a tearing-line is defined, I have shown a variety of structures to which such principle of construction is applicable.

In carrying out my invention I produce in the material of which the vessel or some part thereof is composed, and preferably while the material is in the blank and before it is brought into shape, a ridge, which may be done by a variety of mechanical means.

In the drawings, D represents the body or substance of such a blank, and E the ridge produced therein. This ridge may be produced by a mechanism such as that diagrammatically illustrated in Fig. 16, and comprising a roll A, having a bead $a$ thereon, and roll C, having a fissure $c$ therein, the bead being wider than the fissure, so that when the sheet of metal is passed between the rolls A and C it will be flexed or offset by the bead without being materially compressed or solidified, the metal passing freely into the fissure and thus producing the ridge E on the opposite side of the sheet from the bead-roll. The side of the sheet on which the bead acts will assume the form of the bead and with the form of the bead shown will be curved, as indicated at G, Fig. 1, the boundaries of the curved portions being marked $g'$ $g'$, while the portions of the metal adjacent to the ridge will be raised or offset, as indicated at $e$, and said raised portions terminating in shoulders $e'$. Said sheet of metal may then be passed through a pair of plain rolls, when the blank will assume the form shown in Fig. 2, wherein the raised portions adjacent to the base of the ridge will assume the curved form shown at $e''$ of said figure. The portion G will form a reverse curve, as indicated at $f f'$, and the top and base of the ridge will be in the plane of the surfaces of the body of the sheet. By the action of the bead-roll the metal will be consolidated or condensed at the base of the ridge, thus structurally changing it so that it will part more readily under a tearing strain than if it were not subjected to this action, and the ridge will define the line upon which the metal will part. The cross-sectional form of the ridge may be considerably varied, and in some instances the metal need not be condensed or solidified on both sides of said ridge. As shown in Fig. 3, the ridge is applied in the cover or head of the can, and is of a slightly different form in cross-section.

To show the various applications of the invention, I will now refer, briefly, to the remaining figures of the drawings.

Figs. 4 to 8, inclusive, show the application of my invention to the heads of a cylindrical package, the line E indicating the ridge and $d$ a tongue integrally formed with the head, and $d'$, Fig. 8, an inserted tongue. In the construction shown in Figs. 4, 5, and 6 the tongue projects from the periphery of the blank. In Fig. 4 the ridge and tongue are radial. In Fig. 5 the ridge and tongue are parallel to the radius. In Fig. 6 the ridge is in the form of a volute. In Figs. 7 and 8 two concentric ridges are employed, one being located at the perimeter of the can and the other interiorly thereof.

Fig. 9 shows a can with a strip projecting from its head, a ridge formed in said head, and the manner of opening the can by the aid of a suitable implement, such as the key shown.

Fig. 10 shows the ridge E applied to the flange of the cover and a second ridge E' thereon running from the lower edge of said flange to the ridge E and defining a portion of the boundary of a strip F, which may be torn off to remove the head of the can.

Fig. 11 shows the application of my invention to a capsule such as is used for closing a vessel having a shouldered stopper and in which parallel ridges E E are provided circumferentially of the capsule and in which the portion F is removed by tearing it away by the aid of the tongue $d$.

In Fig. 12 a capsule or covering for the top of a vessel has the ridges E E extending across the center thereof, thus defining the tearing-strip F with the integral projecting tongue $d$. In this construction when the strip is torn out the two portions of the capsule thus separated will fall away. The capsules of Figs. 11 and 12 are applied to close a packing vessel having a shouldered neck and are crimped below the said shoulder, the ridges serving to strengthen the capsule and providing the tearing-lines.

Fig. 13 shows a vessel having its body portion provided with a ridge E, the metal above said ridge being torn out and away from the solder-joint of the cap or cover. Fig. 14 shows two ridges provided in the body of the vessel, with a removable strip F between them.

Fig. 17 represents a blank which is provided with a tongue $d$, projecting from one margin of the blank and having the ridge E extending from or adjacent to the base of the tongue to the edge of the blank. When such blank is formed into a can, the ridge E defines a parting-line.

In Fig. 18 I have shown a cover having a portion forming a tongue $d$ and with an incision $d'$. This tongue may have its base or attached part folded under the flange and its free end projecting through the incision and lying over or outside the flange, as shown in Fig. 19. When the cover is soldered to the can along the lower margin of the flange, the projecting tongue $d$ affords means whereby the lower portion of the flange may be torn off along the ridge E and away from the solder-joint.

Figure 1:
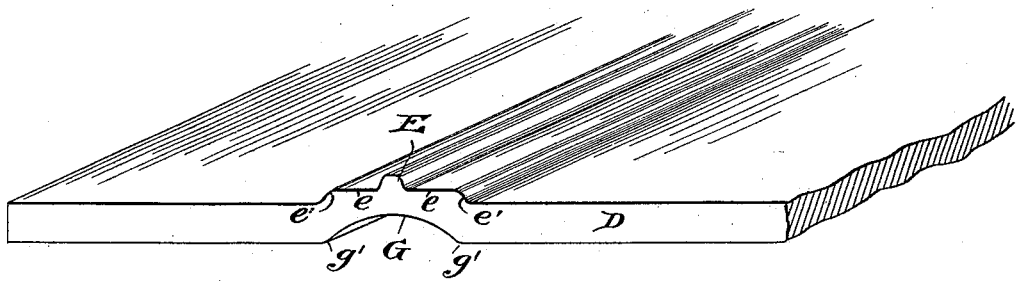
Figure 2:
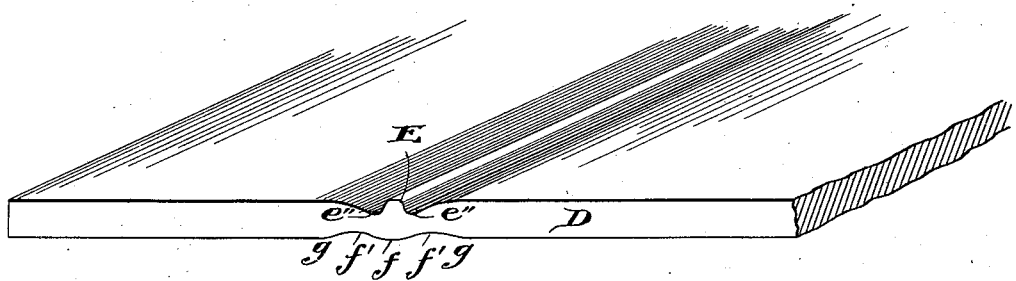
Figure 3:
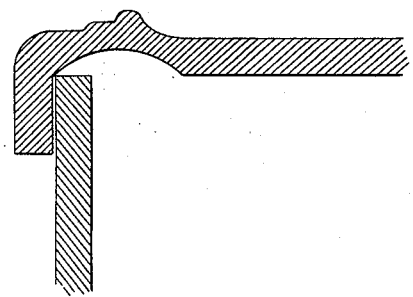
Figure 4:
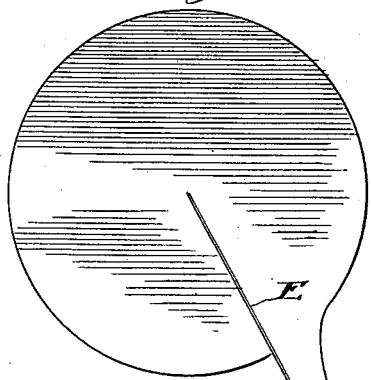
Figure 5:
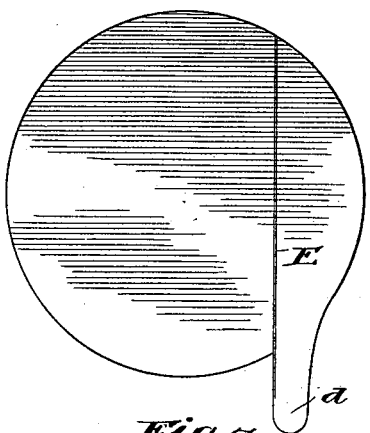
Figure 6:
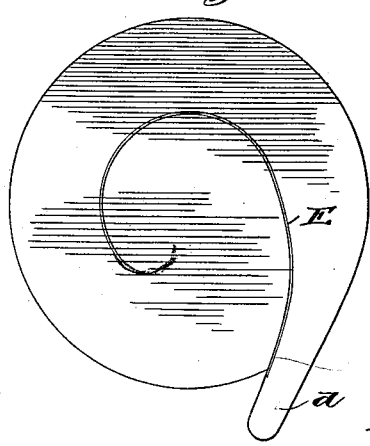
Figure 7:
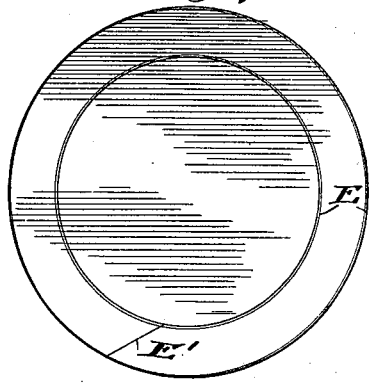
Figure 8:
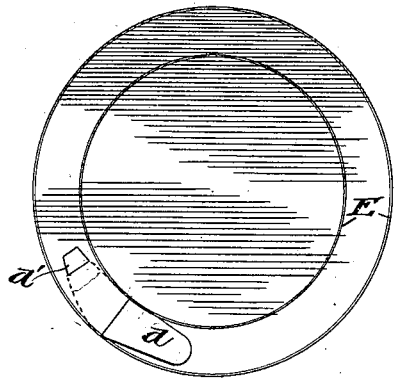
Figure 20:
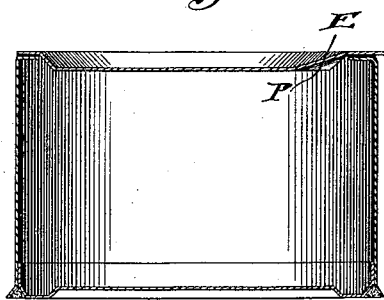

In Fig. 20 is shown a modification of solder-joint in which the can-body itself is flanged inwardly at the top, leaving a horizontal seam or solder-joint joining the flanged cover to the body. In this construction the tongue projects from the edge of the cover and the ridge extends from the tongue into the cover along a raised portion P thereof, which enables the parting of the metal along the ridge on the slope, which it would not do in the absence of this sloping or raised portion. The ridge will follow the apex of the slope and may extend around the cover of the can in the manner shown in Fig. 9 or in the volute form of Fig. 6.

Figure 21:
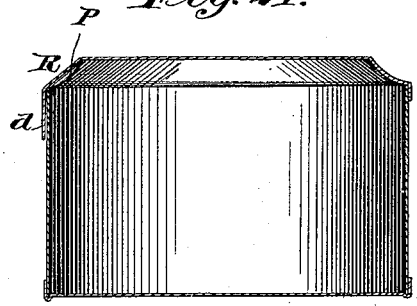

Fig. 21 represents a section of a can having the raised portion P with a ridge extending thereacross from the base of the tongue $d$.

Figure 22:
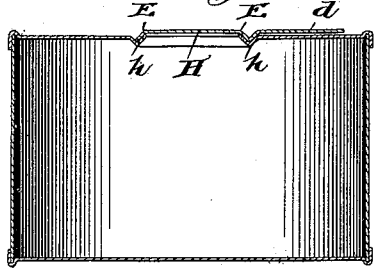
Figure 23:
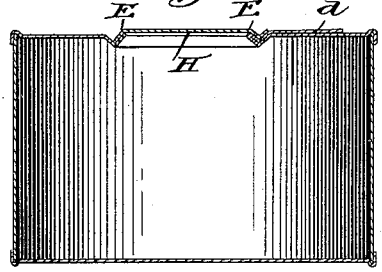

Figs. 22 and 23 show my invention applied to a can-cap, such cans having a filling-opening in the head thereof provided with solder-groove $h$, and the cap H having its edge turned down for sealing. In Fig. 22 the tongue $d$ is formed on the edge of the cap, a ridge E being formed in the cap, so that the solder joint will be torn out along the base of such ridge. In Fig. 23 the tongue $d$ is formed as a part of the metal of the head of the can and is doubled back on itself in the solder-groove, the cap H being soldered over the doubled portion. The ridge is formed in the cap, so that when strain is exerted upon the tongue the latter will break off from the head and adhere to the cap, thus furnishing means for tearing the latter out along the ridge E.

Figure 24:
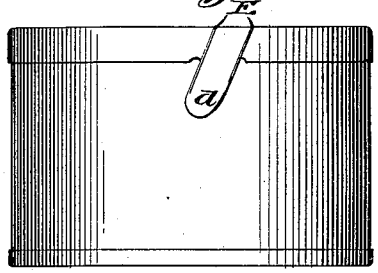

In Fig. 24 I have shown a can having parallel ridges extending along the margins of a tongue formed on the flange of the cap and through said flange and over upon the head of the can.

I claim—

1. A packing vessel or receptacle having a tearing-line provided by two parallel condensed or compressed lines and an intermediate ridge, substantially as described.

2. A packing vessel or receptacle having an offset portion, a ridge in said offset portion and the metal being condensed or solidified adjacent to said ridge, substantially as described.

3. A packing vessel having a portion thereof provided with a projecting tongue and a ridge extending from said tongue into an adjacent portion of the vessel, substantially as and for the purpose described.

4. A packing vessel having a portion thereof provided with a projecting tongue and a ridge extending from said tongue to and upon an adjacent portion of the vessel, the material adjacent to the ridge being condensed or solidified, substantially as and for the purpose described.

5. A packing vessel having a portion thereof provided with a ridge and having the material adjacent to the ridge condensed or solidified, a projecting tongue and said ridge extending upon said tongue along the margin thereof, substantially as described.

6. A packing vessel having a ridge defining one side of a tearing-strip and a tongue projecting from said strip, the ridge being extended longitudinally of the tongue and along the margin thereof substantially as described.

7. A packing vessel having a ridge defining one side of a tearing-strip, a projecting tongue, and said ridge extending across the juncture of the tongue with the body and upon said tongue, substantially as described.

8. A packing vessel having a flanged cap, cover or closure for the opening thereof and a ridge formed in the material of said cap, cover or closure and extending into or through the flange, substantially as described.

9. A packing vessel having an offset portion with a ridge on said offset portion and the material of said portion adjacent to the ridge and on both sides thereof being condensed or solidified, substantially as described.

10. A sheet-metal packing vessel having in some portion thereof a ridge defining one side of a tearing-strip and a second ridge in the material arranged at an angle to the first-mentioned ridge and defining another portion of the boundary of said strip, substantially as described.

11. A sheet-metal can or other receptacle having ridges formed in the metal thereof and providing predetermined opening-lines and an integral tongue extending from the body of metal inclosed by said ridges, substantially as and for the purpose described.

12. A sheet-metal receptacle having a ridge extending around the cover thereof in proximity to its edge and a second ridge close to or connected with the first and gradually diverging therefrom whereby to define a gradually-widening tearing-strip, substantially as described.

13. A sheet-metal packing vessel having an annular depression in one of its walls, said depressed portion having a transverse elevation or slope crossing the bottom of the depression, a ridge traversing said elevated portion and a projecting tongue, substantially as described.

FRANCIS P. McCOLL.

Witnesses:
L. F. McCREA,
C. C. LINTHICUM.